United States Patent
Hoang et al.

(10) Patent No.: US 6,598,849 B2
(45) Date of Patent: Jul. 29, 2003

(54) PRESSURE COMPENSATION/CONTROL FOR FAIL-SAFE GATE VALVE

(75) Inventors: Loc C. Hoang, Houston, TX (US); Jim E. Kilmoyer, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 26 days.

(21) Appl. No.: 10/036,997

(22) Filed: Dec. 21, 2001

(65) Prior Publication Data

US 2003/0116733 A1 Jun. 26, 2003

(51) Int. Cl.$^7$ .............................................. F16K 31/122
(52) U.S. Cl. ....................................... 251/62; 251/63.6
(58) Field of Search ................................ 251/62, 63, 63.4, 251/63.5, 63.6, 326, 327, 328, 329

(56) References Cited

U.S. PATENT DOCUMENTS

| | | | |
|---|---|---|---|
| RE29,322 E | 7/1977 | Nelson | 251/14 |
| RE30,115 E | 10/1979 | Herd et al. | 251/63.6 |
| 4,172,466 A * | 10/1979 | Pattarini et al. | 137/488 |
| 4,230,299 A | 10/1980 | Pierce, Jr. | 251/14 |
| 4,281,819 A | 8/1981 | Linder | 251/328 |
| 4,311,297 A | 1/1982 | Barrington | 251/63.6 |
| 4,489,918 A | 12/1984 | Kalsi | 251/328 |
| 4,650,151 A * | 3/1987 | McIntyre | 251/62 |
| 4,662,601 A * | 5/1987 | Anderson | 251/35 |
| 4,809,733 A | 3/1989 | Hawkins | 137/236.1 |
| 6,125,874 A | 10/2000 | Holliday | 137/81.2 |

* cited by examiner

*Primary Examiner*—Paul J. Hirsch
(74) *Attorney, Agent, or Firm*—Michael P. Hartmann; Peter A. Bielinski

(57) ABSTRACT

A fail-safe gate valve for sub-sea use features a floating, pressure biased compensating piston whose movement prevents internal pressure buildup from opening movement of the gate. A pre-charged fluid chamber provides the bias on the balancing piston. Using unequal piston diameters reduces the charge pressure. The balancing piston is not connected to the gate so that internal pressures can be employed to act on a net area, which biases the gate toward its fail-safe position.

16 Claims, 3 Drawing Sheets

PRESSURE COMPENSATION/CONTROL FOR FAIL-SAFE GATE VALVE

FIELD OF THE INVENTION

The field of the invention is valves with a failsafe mode of closure for oilfield use, primarily in sub-sea applications and more particularly, in the preferred embodiment, which compensate for a rise in internal pressure around the gate when opening and allow internal line pressure to assist in valve closure.

BACKGROUND OF THE INVENTION

Valves used in sub-sea drilling applications have had actuators with fail-safe closure provisions. Generally, the force required to return the actuator piston and the valve to a fail safe position, which, in most cases were the fail closed position is from the spring force and the actuator stem force. The spring force is normally relatively low in comparison to the total force required for fail-safe operation. The actuator stem force is a primary fail-safe force presented a net area of the stem cross-sectional area that was exposed internally to the valve body. Generally a spring or springs were used to return an actuating piston and the valve gate to a fail-safe position, which, in most cases was the closed position. In some designs, the valve actuator stem presented a net area exposed to internal valve pressure, which, in the absence of hydraulic pressure on the actuating piston provided a net force to move the gate to its fail-safe position. These large unbalanced forces were needed to overcome gate drag due to internal pressures in the valve body forcing the gate laterally. The return spring would also act on the actuating piston to urge the gate to the fail-safe position.

In drilling applications a condition could exist where the valve body is full of an incompressible fluid like drilling mud. When trying to stroke the gate from a closed to an open position, the stem connecting the gate and the actuating piston would enter the valve body. If the valve body was full of an incompressible fluid, the internal pressure could rise to the point that the maximum working pressure of the valve body could be exceeded. Additionally, further movement of the gate could be stalled as the pressure buildup around the gate could rise to the level where the hydraulic system acting on the actuating piston could not overcome the built up internal pressure from the surrounding incompressible fluid. To compensate for this effect, a balancing stem was attached to the lower end of the gate, to minimize or eliminate this pressure buildup that would otherwise occur as the valve is actuated to open. However, the addition of the balancing stem attached to the gate solved one problem but created another. Since the gate was essentially in pressure balance from internal valve pressure a net unbalanced force was no longer available to overcome gate drag when a fail-safe operation was required. Normally, the return springs could only put out a few thousand pounds of force to assist in the fail-safe movement, but to overcome gate drag forces well in excess of 25,000 pounds would be needed. The solution to the problem was to design an auxiliary pressurized accumulator, which could take the place of the force formerly provided by internal pressure acting on a net area of the gate assembly to drive it to the fail-safe position. The accumulators were large and heavy and their required size and weight increased with the sub-sea depth of the application. They also presented safety concerns in that their pressure had to be released to equalize with the sub-sea pressure before being brought to the surface. They also presented safety concerns in that their pressure had to be vented prior to actuator disassembly to avoid injury to maintenance personnel.

Various designs of sub-sea drilling gate valves have been attempted, some with the pressure balanced feature, as shown in U.S. Pat. Nos. 4,809,733; 4,311,297; 4,230,299; 4,489,918; U.S. Pat. No. Re 29,322; U.S. Pat. Nos. 4,281,819; 6,125,874; and U.S. Pat. No. Re 30,115. Of these, the latter two are of most interest as they provide a way to use the surrounding seabed pressure to urge a balancing piston against the gate to make the valve fail-safe. However, even these two latter references do not provide the ability to compensate for a buildup in internal pressure around the gate during opening while at the same time having a provision to allow a net internal pressure to act on an unbalanced gate to achieve a fail-safe position. In the present invention large accumulators are eliminated or minimized. A compensating piston, which is biased toward the gate but not connected to it, is used in the preferred embodiment. A self contained, charged, pressure chamber acts on the compensating piston. An easy retrofit of existing valves is also possible. These and other advantages of the present invention as well as additional features will be more readily appreciated by those skilled in the art from reading the description of the preferred embodiment, which appears below.

SUMMARY OF THE INVENTION

A fail-safe gate valve for sub-sea use features a floating, pressure biased compensating piston whose movement prevents internal pressure buildup from opening movement of the gate. A pre-charged fluid chamber provides the bias on the balancing piston. Using unequal piston diameters reduces the charge pressure. The balancing piston is not connected to the gate so that internal pressures can be employed to act on a net area, which biases the gate toward its fail-safe position.

DETAILED DESCRIPTION OF THE PREFERRED EMBODIMENT

Figures 1, 2:
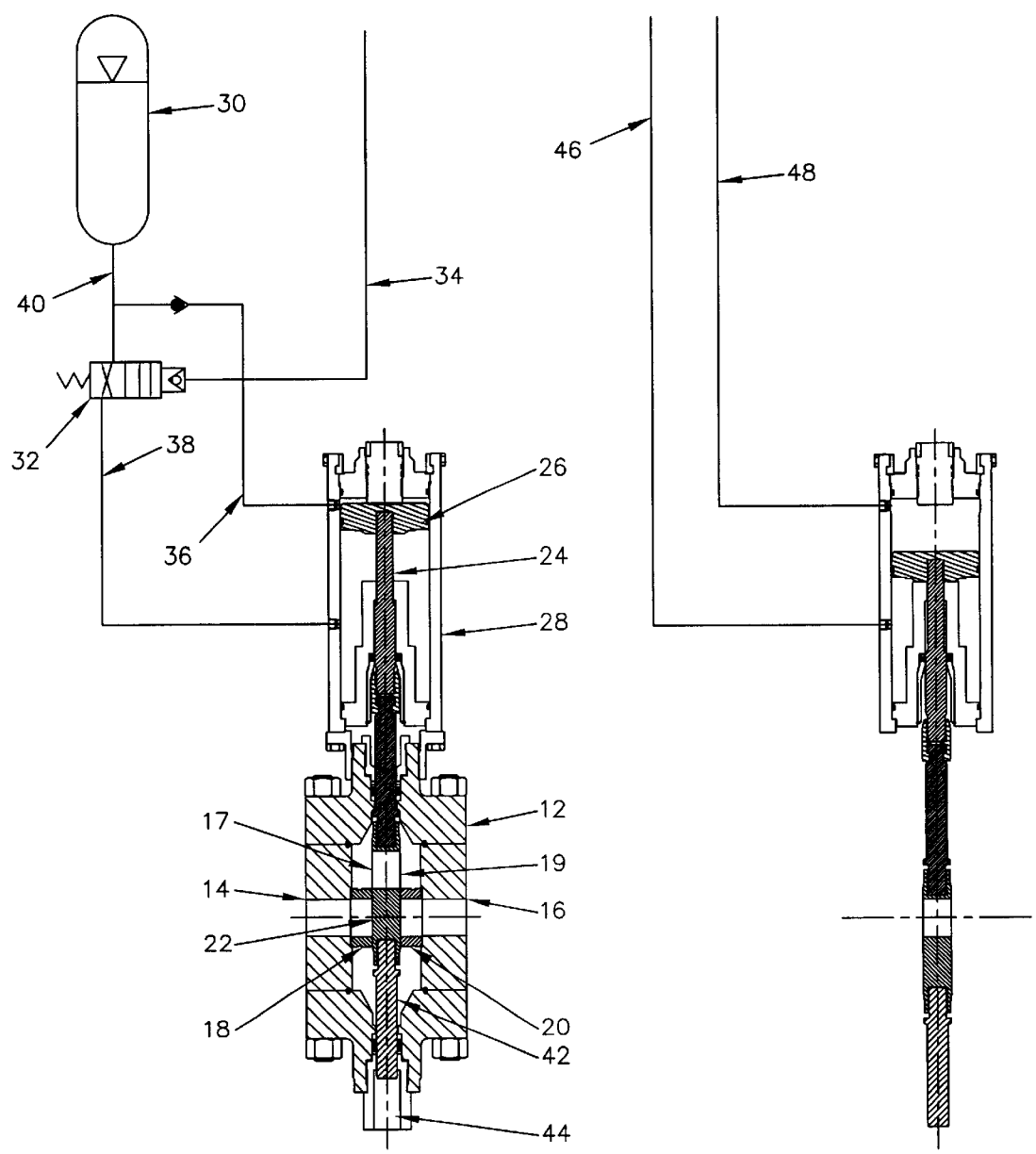
FIG. 1 is a sectional view of a prior art valve using a balancing stem attached to the gate and a single control line to the surface.
FIG. 2 is a sectional view of the valve of FIG. 1, using a dual control line system.

FIGS. 1 and 2 show, respectively, a single and dual control line actuation system for a sub-sea gate valve. The valve 10 has a body 12 and an inlet 14 and an outlet 16. Located in cavity 17 are inlet seat assembly 18 and outlet seat assembly 20, respectively surrounding inlet 14 and outlet 16. A gate 22 is moved between the seat assemblies 18 and 20 so as to isolate with seats, the cavity 17 from passages 16 and 19 in gate 22. An actuator rod 24 is connected to the gate 22 and has a piston 26 near its top end. Piston 26 is sealed at its periphery where it slides against housing 28. An actuation system comprises an accumulator 30 connected to a diverter valve 32 through control line 40. Control line 34 runs from the surface to the sub-sea location of diverter valve 32. Control line 36 runs from housing 28 above piston 26 to control line 40 and to diverter valve 32. Control line 38 runs from housing 28 below piston 26 to diverter valve 32. A balance stem 42 is sealed where it extends through opening 44.

In operation, pressure from control line 34 is directed to control line 36 via diverter 32 and line 40 while control line 38 is aligned through the diverter valve 32 to dump fluid to the surrounding seawater. The accumulator 30 is pressurized from line 34, at this time. Piston 26, actuator rod 24, gate 22 and balance stem 42 all move in tandem to open the valve 10. Because of the presence of the connected balance stem there is no internal pressure buildup in the cavity 17 as the valve opens. At the same time because of the balance stem 42, internal pressure in cavity 17 does not apply a force that will urge the gate 22 in the opposite and fail-safe direction. Upon failure of hydraulic pressure to diverter valve 32 it assumes a position where pressure from control line 38, coming from the gas charged accumulator 30, moves the piston 26 upwardly as flow from line 36 is directed through diverter 32 and back to the surface through line 34. At the time of failure, there is no pressure beyond hydrostatic in line 34.

FIG. 2 illustrates the use of two control lines, which can be alternatively pressurized or vented to urge the gate 22 up or down. The equipment to do that is at the surface. FIG. 2 has the disadvantage of having to run double the amount of control lines potentially thousands of feet sub-sea. The design of FIG. 1 has the disadvantage of large and heavy equipment, which may not fit in confined areas sub-sea or may be difficult to access or to deliver to the location. The cost factor can become significant due to the high pressure ratings involved for the components, such as the accumulator 30.

Figure 6:
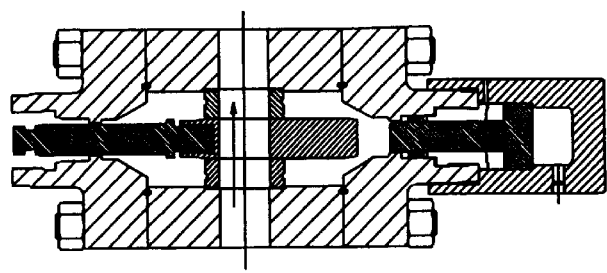
FIG. 6 is the view of FIG. 5 with the valve fully open.
Figure 3:
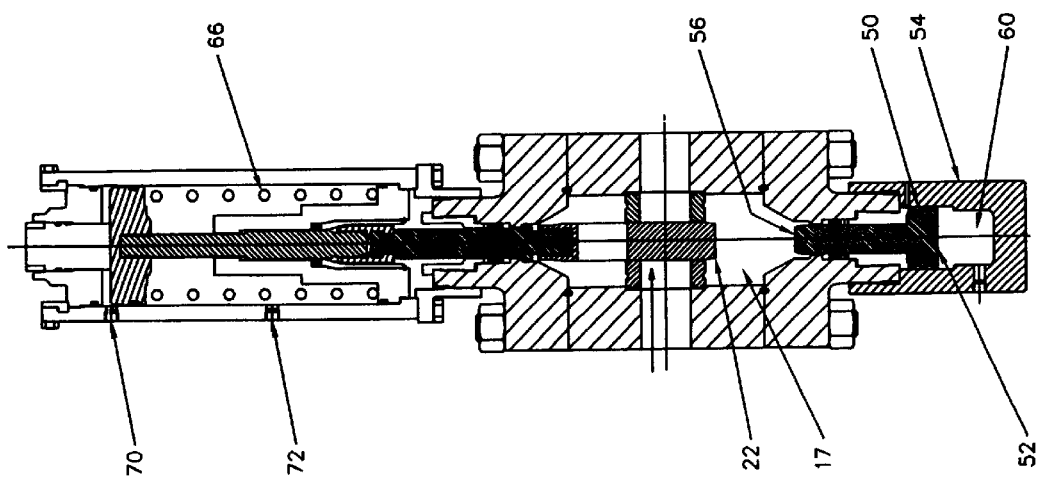
FIG. 3 is a sectional view of the valve of the present invention, in the closed position.
Figure 7:
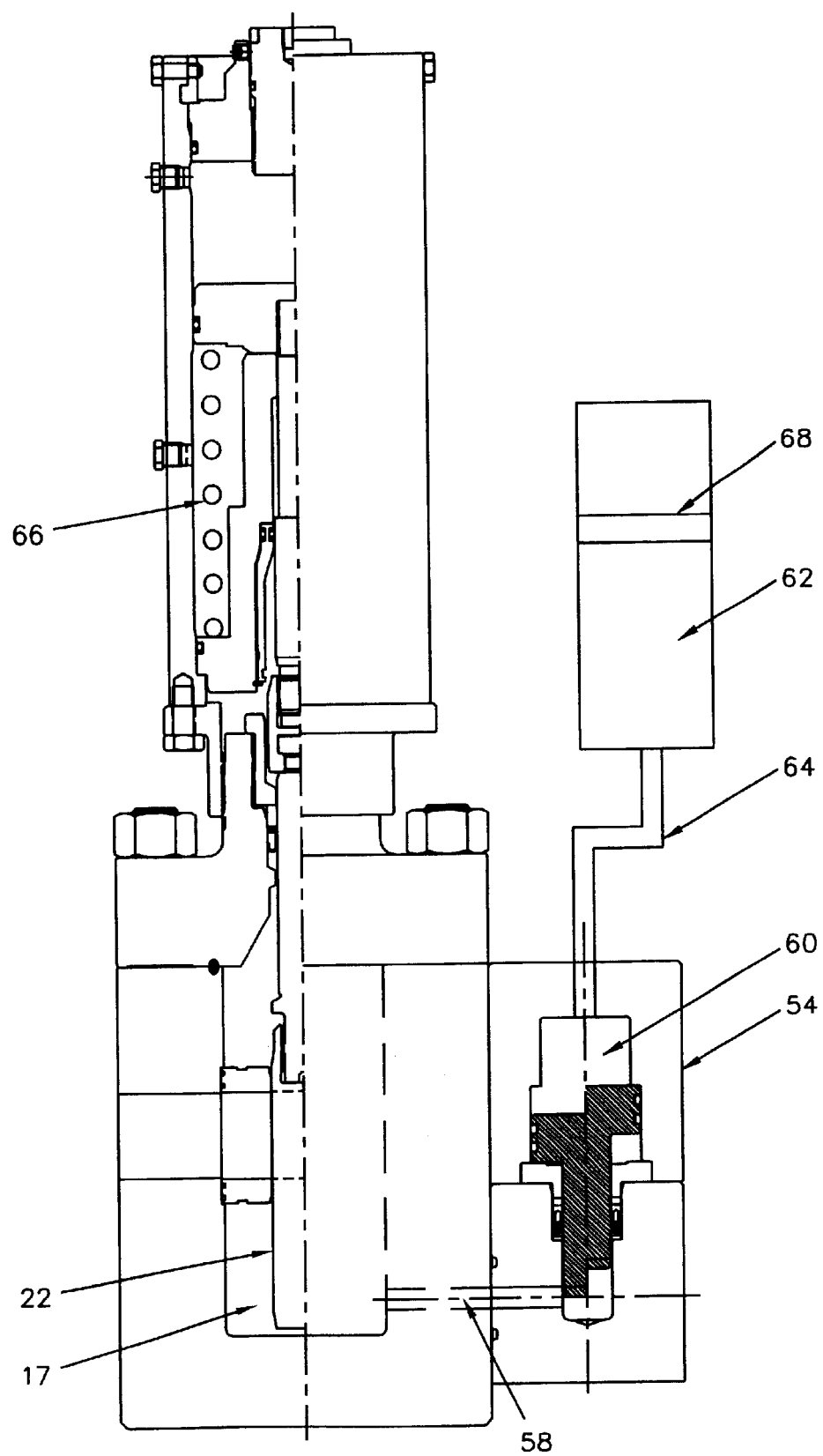
FIG. 7 is an alternative embodiment as to the placement of the compensating piston.

The present invention, in the preferred mode, is illustrated in FIGS. 3–7. The parts that are the same as in FIGS. 1–2 will be identically numbered. The differences are the use of a balancing piston 50, which has a large area 52 in chamber 54 and a small area 56 exposed to cavity 17. While piston 50 is shown to be solid it can take many shapes. Area 56 can be recessed to create an upwardly facing receptacle to overly a tab (not shown) at the base of gate 22 to guide gate 22 while still performing the same pressure compensation feature and allowing internal pressure to exert an unbalanced force on the gate 22 to urge it to its fail-safe position. Gate 22 is not attached to piston 50 and is not intended to contact piston 50. As shown in FIG. 3 the piston 50 is in alignment with gate 22, but such alignment is optional, as shown in FIG. 7. There a passage 58 communicates to chamber 54 and piston 50 is offset and parallel to gate 22. Chamber 54 has a variable volume cavity 60, which connects to a reservoir 62 through line 64. Reservoir 62 has a movable piston 68, above which is a pre-charge of pressure, preferably nitrogen. The area 52 being larger than the area 56 allows the use of lower pressure in reservoir 62. Thus, for example if the maximum desired pressure in cavity 17 is 15,000 pounds per square inch (PSI) and the area ratio of areas 52 to 56 is 3 to 1, then the required nitrogen pressure in reservoir 62 is only 5,000 PSI. Piston 50 is biased by the nitrogen against a travel stop and in FIG. 3 is in its uppermost position. Conversely, because piston 50 is inverted in FIG. 7, it is in its lowermost position, as the valve 10 is getting ready to open. FIG. 7 shows a split view of piston 50 in the extremes of its range of motion.

Figure 4:
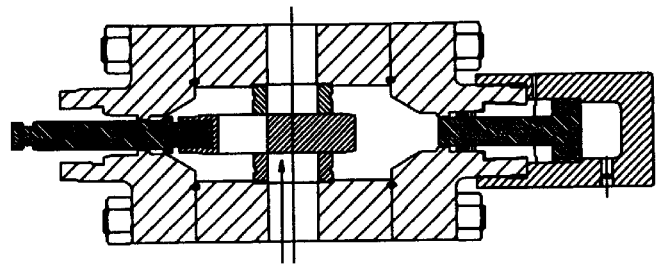
FIG. 4 is the view of FIG. 3 showing downward gate movement prior to the onset of flow through the valve.

Comparing FIGS. 3 and 4 it can be seen that as the gate moves downwardly tending to raise the pressure in cavity 17, the piston 50 moves in a direction to decrease the volume of variable volume cavity 60, which at the same time increases the volume of cavity 17 to avoid pressure buildup. There is as yet no flow in the FIG. 4 position. The only thing that has occurred is the gate moving down as well as piston 50 so as to avoid pressure buildup beyond the desired pressure in cavity 17. That target pressure in cavity 17 is based on the area ratios of areas 52 and 56 and the nitrogen pressure initially charged in reservoir 62. Since the piston 50 is not linked to gate 22, when it comes time to go to the fail-safe position, there is an unbalanced force on the gate 22 from internal pressure in valve 10. This force is enhanced by closure spring 66. Unlike the FIG. 1 design, an accumulator 30 is not needed in the control system. In the event there is low or no pressure in valve 10 when it needs to go into the fail-safe mode, the force of spring 66 is sufficient because there is little or no gate drag force to overcome.

Figure 5:
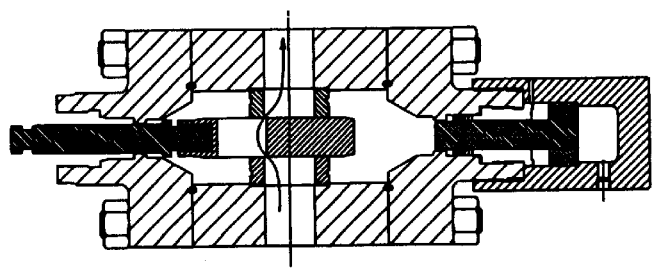
FIG. 5 is the view of FIG. 4 with flow through the valve just beginning.

FIG. 5 shows the onset of flow through the valve 10, at which point further displacement of gate 22 does not tend to further raise the pressure in cavity 17 and there is no further displacement of piston 50 into chamber 54. FIG. 6 shows the wide open position. A variety of control systems, hooked up to actuator housing 28 to make the piston 26 travel down or allow it to be driven up for the fail-safe mode can be used without departing from the invention. Reservoir 62 can be made integral with chamber 54 such as by placing barrier piston 68 in cavity 60 with the nitrogen pressure on the opposite side from piston 50. The configuration of FIG. 3 is readily amenable to a retrofit on existing valves so as to simplify the attendant control system by elimination of an accumulator 30 and some of the associated control lines. The control system can be no more complicated than a single control line 70, which can equalize with line 72 for closure of the gate 22. Normal operation can be nothing more than applying or removing a pressure in line 70. Provisions can be made in the control system so that spring 66 does not have to close against hydrostatic pressure in line 70. While those skilled in control system design will appreciate the variety of systems that can be implemented, the system simplification as compared to FIGS. 1 and 2 is due to the piston 50 not being attached to the gate 22, which lets an unbalanced force act to close the valve from within using internal pressure. Spring 66 also provides an assist to reach the fail-safe condition. If the valve has no internal pressure when the fail-safe position is needed, the spring 66 can push the piston 26 against the minimal gate drag present with no internal pressure. The accumulator of FIG. 1 is no longer needed. For opening, the use of piston 50 biased with nitrogen or other type of pressure from reservoir 62, if separate or from chamber 54 if reservoir 62 is integral with it, prevents housing overpressure or stalling of gate 22 during the opening procedure.

In FIG. 1 item 14 is the inlet and 16 is the outlet. This valve is unidirectional, where 14 and 16 cannot be reversed and bidirectional, where 14 and 16 can be reversed. One reservoir 62 can be used to control the cavity 60 pressure to two or more valves. Line 64 would tee or branch to the individual valves, each having its own chamber 54. The reservoir 62 would be sized with capacity to control any valve individually or to control all valves, if actuated simultaneously. Chamber 54 can be mounted remotely from the individual valve. Separate chambers or one larger common chamber 54 would service all valves. A line could be run from the individual cavities 17 to the common chamber 54. Chamber 54 and reservoir 62 could be a combined unit or separate structures.

The above description is illustrative of the preferred embodiment and various alternatives and is not intended to embody the broadest scope of the invention, which is determined from the claims appended below, and properly given their full scope literally and equivalently.

We claim:

1. A gate valve, comprising:

a body defining a cavity therein and having an inlet and an outlet;

a gate reciprocally movable in said cavity between an open position where an opening in said gate is substantially aligned with said inlet and outlet and a closed position where a solid portion of said gate is substantially aligned with said inlet and said outlet;

said body further comprising seats in contact with said gate on opposite sides thereof to selectively seal said cavity at said inlet and outlet when said gate is in said closed position; and a pressure compensation system for pressure which increases in said cavity as a result of movement of said gate from it said closed position towards its open position said system movable independently of said gate.

2. The valve of claim 1, wherein:

said pressure compensation system is not in physical contact with said gate.

3. The valve of claim 1, wherein:

said pressure compensation system comprises a piston in said body having one end exposed to said cavity.

4. The valve of claim 3, wherein:

said piston is biased toward said gate.

5. The valve of claim 4, wherein:

said piston does not contact said gate.

6. The valve of claim 1, wherein:

said gate experiences an unbalanced force-toward one of its two end positions as a result of internal pressure in said body.

7. The valve of claim 5, wherein:

said gate experiences an unbalanced force toward one of its two end positions as a result of internal pressure in said body.

8. The valve of claim 1, wherein:

said body further comprises a pressurized reservoir to act on said pressure compensation system to forestall response by said pressure compensation system until a predetermined pressure in said cavity is reached as said gate moves from said closed toward said open position.

9. The valve of claim 8, wherein:

said pressure compensation system further comprises a piston movable independently of said gate.

10. The valve of claim 9, wherein:

said piston does not contact said gate.

11. The valve of claim 10, wherein:

said reservoir is retrofitted at the base of said body to an existing valve.

12. The valve of claim 10, wherein:

said reservoir is mounted externally to said body and in fluid communication with said piston, on one end thereof.

13. The valve of claim 12, wherein:

said reservoir is at least partially filled with liquid in communication with said piston and further comprises a movable barrier on top of which compressible fluid under pressure is stored so as to pressurize said liquid.

14. The valve of claim 13, wherein:

said compressible fluid biases said piston toward said gate until a predetermined pressure in said cavity is reached at which point said piston is displaced compressing said compressible fluid.

15. The valve of claim 6, further comprising:

an actuator assembly having a housing and an actuator piston therein with a rod connected to said gate and a biasing device to urge said rod in a fail-safe direction, whereupon removal of applied pressure to said actuator piston said unbalanced force in said body urges said gate to said fail-safe position.

16. The valve of claim 15, wherein:

said biasing-device needed to urge said gate to said fail-safe position if pressure in said body is below a predetermined amount.

* * * * *